United States Patent
Dörfler et al.

(10) Patent No.: US 11,815,193 B2
(45) Date of Patent: Nov. 14, 2023

(54) VALVE AND METHOD FOR MANUFACTURING VALVE

(71) Applicant: Alfmeier Präzision SE, Treuchtlingen (DE)

(72) Inventors: Erich Dörfler, Landsberg (DE); Jürgen Baumgartl, Treuchtlingen (DE); Helmut Auernhammer, Höttingen (DE)

(73) Assignee: Alfmeier Präzision SE, Treuchtlingen (DE)

( * ) Notice: Subject to any disclaimer, the term of this patent is extended or adjusted under 35 U.S.C. 154(b) by 263 days.

(21) Appl. No.: 17/317,210

(22) Filed: May 11, 2021

(65) Prior Publication Data

US 2021/0356055 A1 Nov. 18, 2021

(30) Foreign Application Priority Data

May 12, 2020 (DE) .................. 10 2020 205 983.7

(51) Int. Cl.
*F16K 31/02* (2006.01)
*F16K 27/02* (2006.01)

(52) U.S. Cl.
CPC .......... *F16K 31/025* (2013.01); *F16K 27/02* (2013.01)

(58) Field of Classification Search
CPC ......... A47C 7/142; A47C 7/467; B60C 29/00; B60N 2/665; B60N 2/914; F16K 31/025;
(Continued)

(56) References Cited

U.S. PATENT DOCUMENTS

2008/0185541 A1* 8/2008 Ukpai ................. F16H 57/0447
251/11
2013/0327967 A1* 12/2013 Deperraz ............. F16K 31/025
251/11
(Continued)

FOREIGN PATENT DOCUMENTS

DE 202018101851 U1 5/2019
EP 3281821 2/2018

OTHER PUBLICATIONS

German Search Report for Application No. DE 10 2020 205 983.7, dated Mar. 12, 2021, with English Translation.

*Primary Examiner* — Kevin F Murphy
*Assistant Examiner* — Jonathan J. Waddy
(74) *Attorney, Agent, or Firm* — JK Intellectual Property Law, PA

(57) ABSTRACT

A valve includes a valve housing having first and second regions, at least one valve chamber configured to be pressurized with air and including an actuating element for opening and closing a valve opening and an actuator for actuating the actuating element, both arranged in the first region. A printed circuit board extends into each valve chamber and to electrically operate the actuator, the printed circuit board(s) being connected to a common main printed circuit board arranged in the second region. Each valve chamber is surrounded by boundary surfaces closing the valve chamber in a substantially gas-tight manner. An open space open to at least two oppositely disposed sides of the valve housing extends between at least two of the valve chambers, and a connecting member of the printed circuit boards extends through connecting openings of the boundary surfaces of adjacent valve chambers and the open space. A sealing material located in the open space encloses the connecting member and the connecting openings in a gastight manner at least in the direction of the oppositely (Continued)

disposed sides. A method of manufacturing such a valve includes manufacturing a conductor element including the printed circuit boards and the main printed circuit board; introducing the conductor element into the valve housing; and filling the open space at least in part with the sealing material from at least one side after the introducing step so that the sealing material seals the connecting member and the connecting openings in a gas-tight manner at least in the direction of the oppositely disposed sides.

14 Claims, 3 Drawing Sheets

(58) Field of Classification Search
CPC ............ F16K 99/0034; F16K 99/0036; F16K 99/0038; F16K 99/0042; F16K 99/0044; F16K 99/0046–0053; H05K 7/1427
USPC .......................................................... 251/11
See application file for complete search history.

(56) References Cited

U.S. PATENT DOCUMENTS

| | | | |
|---|---|---|---|
| 2016/0018016 A1* | 1/2016 | Dankbaar | F16K 7/12 251/129.01 |
| 2018/0038514 A1* | 2/2018 | Kuszneruk | F16K 99/0044 |
| 2019/0056040 A1* | 2/2019 | Mitzler | F16K 31/025 |
| 2019/0118690 A1* | 4/2019 | Beuschel | F16K 31/0627 |
| 2020/0378521 A1* | 12/2020 | Dörfler | F15B 15/10 |

* cited by examiner

VALVE AND METHOD FOR MANUFACTURING VALVE

CROSS-REFERENCE TO RELATED APPLICATIONS

This application claims benefit to German Patent Application Number 10 2020 205 983.7, dated May 12, 2020, which is incorporated in its entirety by reference herein.

TECHNICAL FIELD

The present disclosure relates to a valve with a valve housing and a method for manufacturing such a valve.

BACKGROUND

Some known valves are used in systems for controlling the supply of air, compressed air, or other gases to certain regions of vehicle seats, such as lumbar supports in cars or trucks. At the same time, these valves are used not only for supplying, but typically also for discharging the air from the respective systems.

A wide variety of technologies for this purpose are already known from prior art.

These valves are used to selectively act upon air cushions, for example in vehicle seats, with air and to again possibly let the air out of these air cushions.

It is common to use shape memory alloys (SMA), which change their shape when heated and/or cooled, and to use this change in shape to switch the valve between a closed and an open state. It is also possible to use other variants that are already known from the prior art instead of the SMA elements.

The electrical actuation of the SMA elements, which is necessary to control their change in shape, but also the electrical actuation of other implementations of these valves make it necessary to provide a printed circuit board that extends into the individual valve housings of a valve. Since a large number of valve chambers and valve elements are necessary for supplying individual air cushions with compressed air in a selective manner to implement, e.g., a lumbar support, electrical actuation of the actuating element, such as the SMA element, must be realized separately for each of these valve chambers or valve elements, respectively, so that a printed circuit board must extend into each of the valve chambers. In prior art, all actuating elements are typically actuated by a main printed circuit board which is connected to the other printed circuit boards that are arranged in the valve chambers, which requires a connection among the individual printed circuit boards and the main printed circuit board through the valve chambers otherwise provided in a gas-tight manner.

It is known from EP 3 281 821 to seal the passage of the printed circuit board into the individual valve chambers in order to create a gas-tight region so that the individual valve chambers are isolated from one another and from the external environment and that acting upon the individual valve chambers with compressed air and also that holding a desired pressure module can be reliably ensured. For this purpose, the electrical component comprising the main printed circuit board and also the individual printed circuit boards for the valve chambers is introduced into the housing and any remaining free space is subsequently provided with an adhesive that causes the sealing effect.

DE 20 2018 101 851 also shows adhesive points that are arranged at the passage between individual separating elements in the valve in order to seal them.

However, the introduction of the adhesive and the reliable connection to the printed circuit board to the valve housing has proven to be difficult.

SUMMARY

Starting out from known prior art, a technical objective to be satisfied consists of specifying a valve and a method for manufacturing a valve with which reliable sealing of the valve chambers is possible and a configuration of the entire valve can be realized that is as space-saving as possible.

This objective may be satisfied according to the disclosure by the valve according to the following disclosure and the method for manufacturing such a valve according to the following disclosure. Advantageous options and alternatives are specified below.

The valve according to the disclosure is characterized in that each valve chamber is surrounded by boundary surfaces of the housing which close the valve chamber in a substantially gas-tight manner, and a space that is open to at least two oppositely disposed sides of the valve housing extends between at least two valve chambers, where a connecting member of the printed circuit boards extends through connecting openings of the boundary surfaces of adjacent valve chambers and the open space, where the open space contains sealing material which encloses the connecting member and the connecting openings in a gas-tight manner at least in the direction of the oppositely disposed sides.

The open space is a space that would be in open communication with the exterior space without sealing material, so that the open space without sealing material can be understood as being a "hole" in the valve housing. The sealing material does not need to fill the entire open space, but can also only fill it in part. According to the disclosure, the sealing material is there filled into the open space at least in such a way that the connecting openings in the oppositely disposed boundary surfaces of the valve chambers surrounding the open space are sealed.

As a result of this configuration, a valve cover and a valve base surrounding the entire valve or valve housing can be dispensed with so that the overall structure can be configured to be smaller or simpler. This saves space and thereby facilitates the installation even with limited installation space for the valve. Due to the open space, which is open on two sides of the valve housing, the sealing material is easier to fill in and, at the same time, the connecting openings can be sealed more reliably, since any possibly enclosed air bubbles can be prevented.

It can be provided that the open space is defined in a plane, that extends substantially parallel to the main plane of the printed circuit boards, by the boundary surfaces and two further walls of the valve housing, where the boundary surfaces are disposed opposite one another and the further walls are disposed opposite one another and the walls extend between the boundary surfaces.

In this embodiment, the open space is therefore at least laterally defined by the boundary surfaces and the two further walls, but does not necessarily have to have a rectangular or square shape. The open space in the plane can also have, for example, a circular or elliptical or elongate shape with rounded ends.

The main plane of the printed circuit boards is there to be understood as being the plane in which the printed circuit boards extend substantially or have the greatest extension.

The fact that the plane extends only substantially parallel to the main plane of the printed circuit boards presently means that slight deviations from exact parallelism are possible, for example, for the reason that the main plane of the printed circuit boards extends at an angle to this plane, for example, for the reason that the printed circuit boards are arranged at an angle in the valve housings. The angle can be up to an absolute value of 15° and is still to be considered "substantially" parallel at least up to this absolute value. In this manner, the valve housing itself creates the boundary of the open space into which the sealing material can be introduced.

Furthermore, it can be provided that the open space comprises at least one opening in a base of the valve housing or a cover of the valve housing.

Such a base or cover of the valve housing can be provided in order to be able to introduce the printed circuit boards into the valve chambers and to subsequently close these valve chambers. If the open space also extends through the base or the cover, respectively, then this can advantageously be used to affix the sealing material not only in the open space but also with the aid of the base or cove in that the sealing material in one embodiment extends into the open space and on a region of the cover or the base opposite the open space.

In one embodiment, the extension of the open space in at least one direction perpendicular to the longitudinal direction of the opening is greater than the extension of the opening in this direction. The longitudinal direction of the opening is presently to be understood as being the direction which connects the two open ends of the opening in the cover or in the base of the valve housing to one another. If the opening is provided, for example, in the form of a cylinder bore or cylinder opening, then this direction extends from the base to the top surface (or vice versa, respectively) and is perpendicular to the imaginary base or top surface. The region to be sealed is minimized, at least in this direction, by an opening which is smaller than the region of the open space.

Furthermore, the sealing material can fill the open space at least in part. For example, the entire volume of the open space can be filled only to 40% or 50% by the sealing material.

It is not necessary to completely fill the open space as long as the desired sealing effect is ensured. This can be achieved, for example, when the connecting openings in the boundary surfaces and the connecting element are respectively surrounded by the sealing material in a gas-tight manner.

In a further development of this embodiment, the sealing material fills the open space at least in part and the sealing material extends into a region which extends through the opening into the exterior space of the valve. If the material extends not only into the open space but also into the exterior space of the valve separated by the opening in the base or the cover, then the sealing material is affixed because it extends in part in the open space and in part outside the open space outside the base or the cover, respectively. The sealing material disadvantageously detaching and/or slipping away of during the operation of the valve can then be avoided and the tightness of the valve chambers can be ensured over a long period of time.

A spacing of the boundary surfaces in the open space can be 1 mm to 5 mm, in particular 1 mm to 3 mm, in particular 1 mm to 2 mm. These distances enable a reliable and stable structure of the valve housing and at the same time the reliable introduction of the sealing material. Furthermore, only a small amount of sealing material is required to obtain the desired sealing effect.

Furthermore, the spacing between the walls can be 5 mm to 15 mm, in particular 7 mm to 14 mm, in particular 10 mm to 13 mm, and/or the connecting member has a width of 5 mm to 15 mm, in particular 8 mm to 12 mm, in particular 9 mm to 11 mm, along the shortest connecting line of the walls.

Since electrical conductor tracks typically also run over the connecting member, a customary functionality of the valve can be ensured with the appropriate configuration of the open space and the connecting member without having to place additional demands on the printed circuit boards.

The connecting member can extend 1 mm to 3 mm, in particular 1 mm to 2 mm, in particular 1.3 mm to 1.8 mm, in a direction from one to the other oppositely disposed side of the valve housing. Corresponding sizes of the connecting member can still be reliably manufactured using conventional manufacturing processes for the printed circuit boards.

It can be provided that the valve is an SMA valve, where the actuator is an SMA (shape memory alloy) actuator and the conductor element is able to heat the SMA actuator with current to activate it. In combination with the teaching according to the disclosure, SMA valves can be manufactured inexpensively and be reliably actuated during operation.

The method according to the disclosure for manufacturing a valve comprises manufacturing a conductor element comprising the printed circuit boards and the main printed circuit board, where the conductor element in a further step is introduced into the valve housing and the open space is subsequently filled at least in part with the sealing material from at least one side so that the sealing material seals the connecting member and the connecting openings in a gas-tight manner at least in the direction of the oppositely disposed sides.

The valve according to the disclosure can be reliably produced using this method.

In one embodiment, a cover and/or a base of the valve housing is connected to the valve housing before the sealing material is introduced and the sealing material is subsequently introduced so that the sealing material seals the connecting member and the connecting openings in a gas-tight manner at least in the direction of the oppositely disposed sides and extends through the opening of the cover and/or the base into the exterior space of the valve. This ensures that the material extends both into the open space as well as into the exterior space outside of the base or the cover and that affixing the sealing material reliably is ensured.

It is provided in one embodiment that the sealing material is introduced in a liquid state and is subsequently dried. The introduction of a liquid also allows small air spaces to be closed so that reliable sealing can be achieved.

The term "dried" or "drying" is presently to be understood to mean any process that leads to the hardening or solidification of a liquid and/or viscous sealing material during its introduction. The term "dried" therefore comprises, for example, drying by heating, but also UV hardening, hardening of adhesive or liquid plastic with or without the action of heat, cooling, as well as the hardening resulting therefrom and the like. UV hardening there comprises in particular irradiating the sealing material with UV light, thereby causing, for example, the polymerization and hence curing of the sealing material.

DETAILED DESCRIPTION

Figure 1A:
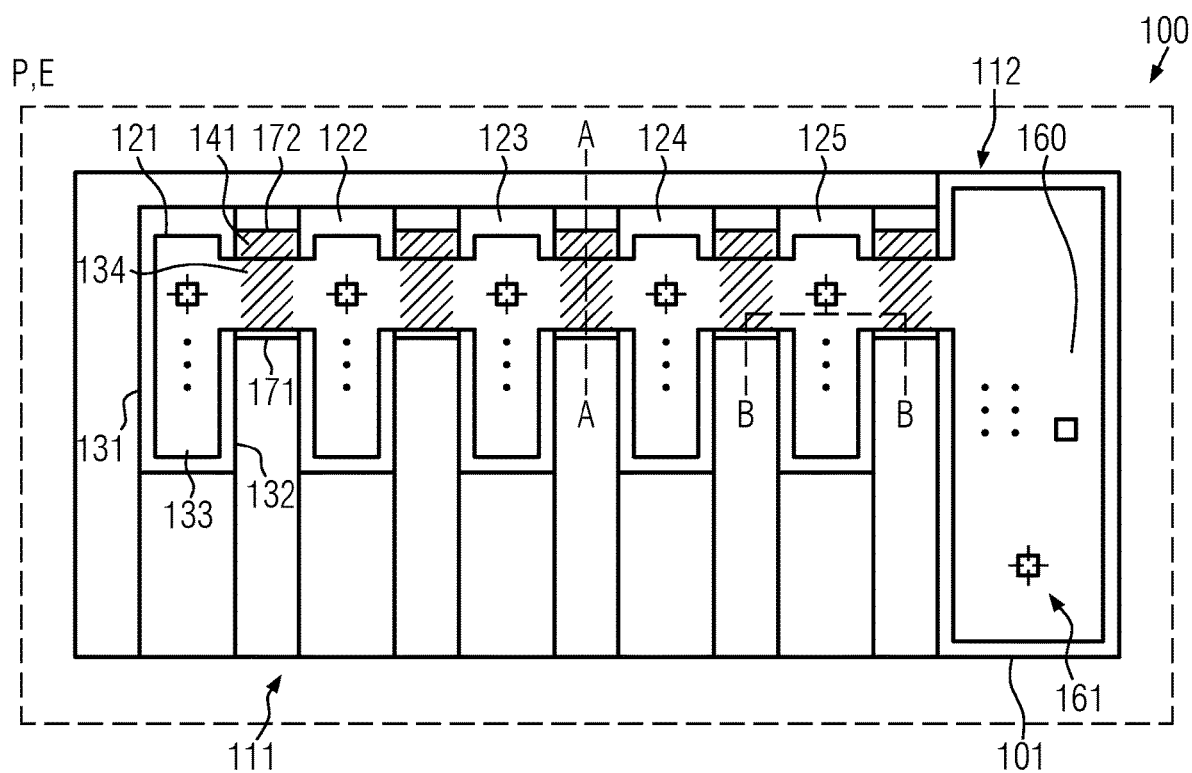
FIG. 1a is a top schematic view showing a valve according to the disclosure.

FIG. 1a shows a schematic view of a valve 100 according to one embodiment of the disclosure. Such a valve can be installed into a vehicle seat in order to be used, for example, as an air supply for one or more air cushions of a lumbar support or the like.

Valve 100 comprises a valve housing 101, presently shown schematically as an outer wall, which can be roughly divided into two regions 111 and 112. A series of valve chambers 121 to 125 is shown in first region 111, which shall be described in more detail in FIG. 1b.

The valve chambers are substantially formed by two oppositely disposed boundary surfaces 131 and 132 which are to be understood as being part of valve housing 101. An actuator is arranged within the valve chambers and, as shall be further explained in FIG. 1b, can actuate an actuating element which in turn can open and/or close a valve opening in order to cause or stop a supply of air or to let out air.

Furthermore, arranged in each of the valve chambers is preferably a printed circuit board 133 which is suitable to actuate the actuator.

If the valve is, for example, an SMA valve (shape memory alloy valves, i.e. valves which comprise a shape memory material for activation), then the actuator is formed from shape memory material or at least includes it. This shape memory material is preferably configured such that it undergoes a change in shape when the temperature changes. The actuating element can then be moved by this change in shape. Since shape memory materials return to their original shape when the temperature drops, adjustment of the actuating element between two settings can thus be effected.

In this embodiment, which is not to be understood as restricting the disclosure, the respective printed circuit board of the valve chamber is preferably configured such that it can cause the SMA actuator to be heated by supplying current. For this purpose, the printed circuit board can comprise a series of electrical and/or electronic components that feed the current received to the SMA actuator.

Individual printed circuit boards 133 are preferably connected via suitable connecting elements 134 to adjacent printed circuit boards of adjacent valve chambers and/or to a main printed circuit board 160. It can be provided in one embodiment in particular that all printed circuit boards are connected via a connecting element (only) to the main printed circuit board. This embodiment is not shown in FIG. 1a. In the embodiment shown, printed circuit board 133, which from the direction of the main printed circuit board is the first, is connected via a connecting element to the main printed circuit board. The further printed circuit boards are then each connected via connecting elements to adjacent printed circuit boards.

Main printed circuit board 160 is preferably arranged in the second region and comprises, for example, control electronics for actuating individual or all printed circuit boards of the individual valve chambers and to supply them with current.

Main printed circuit board 160, connecting elements 134, and individual printed circuit boards 133 together form conductor element 161.

As already described, the valve chambers are defined by respective boundary surfaces 131 and 132. These boundary surfaces close the volume of a valve chamber enclosed by them in a substantially gas-tight manner. This means that the boundary surfaces as such are preferably impermeable to gas and accordingly effect a gas-tight closure of the valve chambers (taking into account existing cover surfaces and base surfaces in addition to lateral boundary surfaces 131 and 132) in that they enclose a volume (the valve chamber) that is separated from the outer environment and thereby sealed in a gas-tight manner.

Connecting elements 134, however, extend through the boundary surfaces of adjacent valve chambers or through the boundary surface of one valve chamber to second region 112 (such as with valve chamber 125). In this region, there is therefore no gas-tight closure of the valve chamber by the boundary surfaces.

According to the disclosure, an open space 141 is created between the boundary surfaces of adjacent valve chambers into which connecting element 134 extends which interconnects the printed circuit boards of adjacent valve chambers. Open space 141 is defined in plane E presently shown, which runs substantially parallel to main plane P of the printed circuit boards, firstly, by the boundary surfaces as well as further walls 171 and 172 to be described later. In the view shown there, planes E and P coincide.

In the embodiment shown in FIG. 1a, this means that boundary surface 132 of valve chamber 121 on the right and the boundary surface of valve chamber 122 on the left together (except for the passage openings for the connecting element) define the open space between the valve chambers at least in part. In addition, this open space can be defined, at least in the plane of the drawing presently shown, by further walls 171 and 172 which extend between the boundary surfaces or from the one boundary surface of a first valve chamber to the other boundary surface of a second valve chamber, respectively, so that in the image planes shown in FIG. 1a, the open space has approximately the shape of a rectangle.

According to the disclosure, the open space is at least in part filled with or contains a sealing material. The sealing material is arranged in the open space in such a way that the connecting member and the connecting openings in the respective boundary surfaces of the adjoining valve chambers are surrounded in a gas-tight manner. This means in particular that no outside air can penetrate into the valve chambers via the open space between adjacent valve chambers.

Figure 1B:
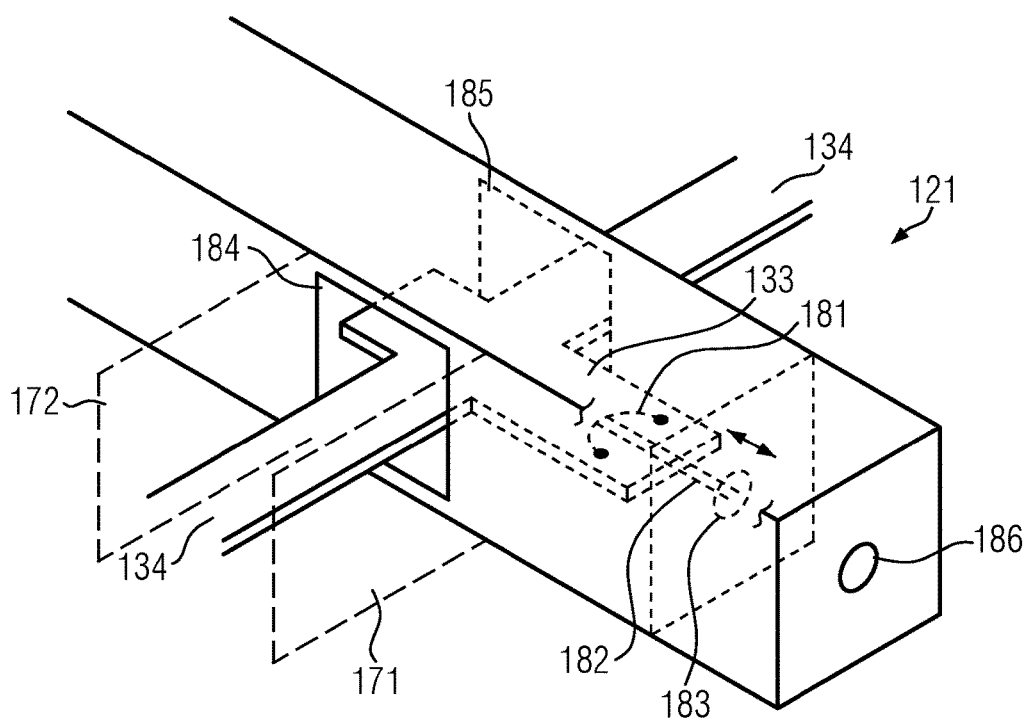
FIG. 1b is an isometric view showing a valve chamber of the valve with an actuating element.

FIG. 1b shows a valve chamber, for example, valve chamber 121, in an exemplary illustration. Printed circuit board 133 and corresponding connecting elements 134 of adjacent printed circuit boards leading to the former are presently shown according to the configuration of FIG. 1a. Furthermore, boundary surfaces 131 and 132 of the valve chamber are shown schematically. Corresponding connecting openings 184 and 185, through which respective connecting elements 134 pass, are provided in the boundary surfaces. The connecting openings can be approximately rectangular and their cross-sectional area selected such that they are only slightly larger than the cross-sectional area of the connecting element. For example, it can be provided that the cross-sectional area of the connecting openings is up to 5% or up to 10% larger than the corresponding cross-sectional area of the connecting element.

In the embodiment presently shown, printed circuit board 133 is connected to an actuator 181 which can actuate actuating element 182, presently in the form of a plunger. The actuation is possible along the double arrow direction illustrated and can have the effect that the plunger can close or open valve opening 183 with the plunger head, for example, to introduce compressed air, introduced into the valve chamber 121, through further opening 186 (which can also coincide with valve opening 183) e.g. into an air cushion. The actuating element can be formed, for example, by an SMA actuator known from prior art or may include such.

Further walls 171 and 172 extending from adjacent boundary surfaces of adjacent valve chambers are presently also shown in broken lines. Provided in the space that is in part defined by walls 171 and 172 and boundary surface 131 (the boundary surface of the adjacent valve chamber is presently not shown), into which connecting element 134 extends, is the sealing material according to the disclosure, as already described with reference to FIG. 1a and which is presently not shown separately.

Figure 2A:
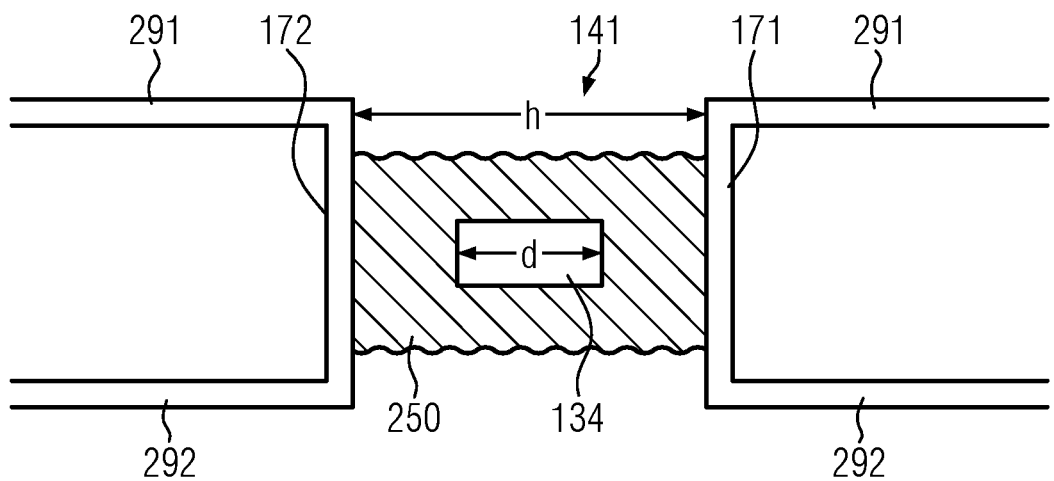
FIG. 2a is a sectional view of one embodiment the valve of FIG. 1a taken across line A-A.
Figure 2B:
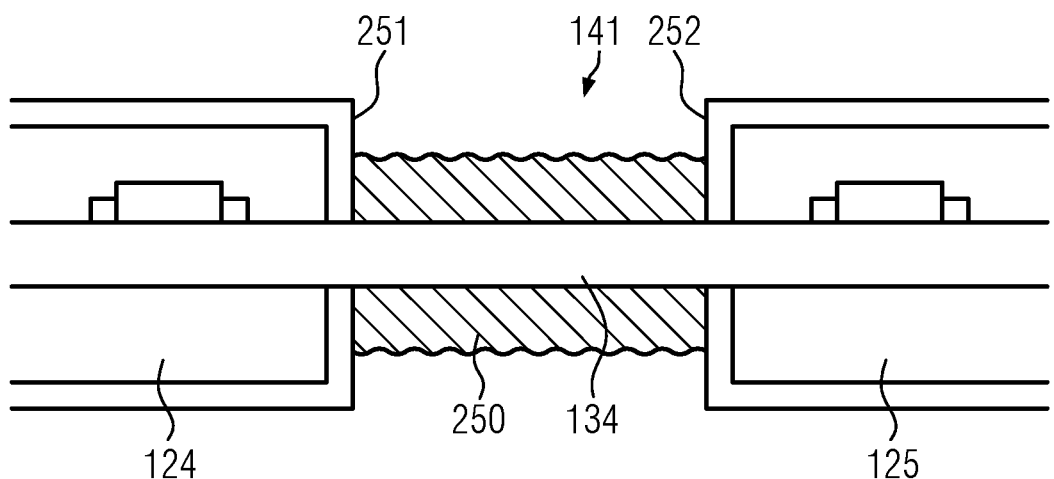
FIG. 2b is a sectional view of one embodiment the valve of FIG. 1a taken across line B-B.

FIGS. 2a and 2b show a first embodiment in a sectional view along visual axes A-A and B-B from FIG. 1a.

The view along visual axis A-A is shown in FIG. 2a. The view is therefore in the direction of a connecting opening 184, 185 of a boundary surface from a point within the open space 141. Further walls 171 and 172 and part of the connecting element are shown. Further walls 171 and 172 are presently configured as part of a hollow body which is formed as part of the valve housing. These hollow bodies can, but do not need to, have respective cover surfaces 291 and respective base surfaces 292. The advantage of the disclosure is that only the open space between the walls needs to be sealed. Further sealing of the cavities is therefore not necessary and weight and material can be saved, for example, by omitting base areas and/or cover areas in the region of the further walls between the valve chambers.

Instead of being part of a hollow body, walls 171 and 172 could also only be configured as substantially planar elements which extend from one valve chamber or one boundary surface of one valve chamber to the other boundary surface of the other valve chamber. In one embodiment, the remaining region between the valve chambers can be free of material.

In the embodiment presently shown, connecting element 134, which connects the printed circuit boards of adjacent valve chambers to one another, extends between these walls 171 and 172. It is also shown that sealing material 250 in the sectional view presently shown substantially completely surrounds connecting element 134. This can, but need not, be the case over the entire dimensions of the open space 141 between adjacent valve chambers, as long as it is at least ensured that sealing of the connecting openings of adjacent valve chambers and connecting member 134 extending through these connecting openings is ensured.

However, in order to obtain the most reliable fixation of the sealing material within the open space, it can be provided that the sealing material completely surrounds the connecting element 134 over the entire dimension of the open space 141 and additionally touches further walls 171 and 172.

As can be seen in FIG. 2a, sealing material 250 does not need to completely fill open space 141; i.e., the sealing material does not need to run from the lower boundary of the further walls shown in FIG. 2a to the upper boundary of the further walls. It is sufficient to have a (complete) enclosure of the connecting element and/or for the sealing of the connecting openings to be ensured.

It can also be seen that no further material is shown above and below the sealing material 250 in the embodiment shown in FIGS. 2a and 2b which forms part of the valve housing. It can be provided particularly preferably in this embodiment that no cover or base or either are provided for the valve housing, but that the open space is instead closed exclusively by the sealing material. In this way, space and material can be saved and the costs for the valve can also be reduced.

FIG. 2b shows a view along visual axis B-B shown in FIG. 1a which runs through the connecting element and into adjacent valve chambers 124 and 125. Valve chambers 124 and 125 are shown with respective adjacent boundary surfaces 251 and 252 which also define open space 141.

In addition to boundary surfaces 251 and 252, valve chambers 124 and 125 comprise further surfaces, as already described, which effect a substantially gas-tight closure of the respective valve chambers. In the region between boundary surfaces 251 and 252, however, no further material of the valve housing needs to be provided, but the open space between the boundary surfaces can also only be sealed by the sealing material, provided that the connecting openings in the boundary surfaces and the connecting element are separated from the outer surrounding by the sealing material.

The distances between oppositely disposed boundary surfaces 251 and 252 can also be selected depending on the size requirements for the valve. In this case, it is preferably ensured that the sealing material does not fail to achieve the intended effect due to possibly undesired capillary effects during manufacture. For example, the smaller the overall external dimensions of the valve, the smaller the distance can also be selected between the oppositely disposed boundary surfaces.

For this purpose, it can be provided that the distance between adjacent boundary surfaces 251 and 252 is between 1 and 5 mm, in particular between 1 and 3 mm and particularly preferably between 1 and 2 mm, approximately 1.6 to 1.7 mm. These distances are relatively small and therefore even reduce the overall size of the valve. At the same time, however, it can be ensured that the sealing material causes reliable sealing of the open space. The stability of the printed circuit boards and the connecting elements is also not impaired with these dimensions.

The distance between oppositely disposed further walls 171 and 172, as shown in FIG. 2a, however, can be selected to be larger, which is in particular due to the typically larger extension of the connecting element in this direction through which the lines for current supply of the individual printed circuit boards must be passed. The distance between further walls 171 and 172 can be between 5 mm and 15 mm, in particular between 7 and 14 mm, particularly preferably between 10 and 13 mm. With these dimensions, common printed circuit boards, which are already used in the context of other implementations of prior art valves, can likewise be employed also for the valve according to this disclosure, which reduces the cost of manufacturing the valves.

Due to these dimensions between oppositely disposed walls 171 and 172, it is particularly preferred to have the connecting member have a width along the shortest connecting line of the walls of 5 to 15 mm, in particular 8 to 12 mm, particularly preferably 9 to 11 mm, in order to ensure that the sealing material can surround the connecting element, preferably entirely. It is understood that the width of the connecting element in this direction must be smaller than the spacing of oppositely disposed walls 171 and 172.

It is particularly preferred to have width d presently shown of connecting element 134 be smaller, preferably at least 2 mm smaller than the spacing h of walls 171 and 172. During the manufacture of the valve, for example, when using liquid sealing material which is dried after being introduced into the open space during the manufacture of the valve, a complete flow around the connecting element can be effected and at the same time only one access opening or the introduction of the liquid material from only one direction is necessary in order to effect sealing of the open space and connecting element 134 introduced therein.

Drying the sealing material can comprise, for example, cooling the sealing material introduced, and/or irradiating the sealing material introduced with UV light (UV curing) or visible light, and/or drying by heating the sealing material introduced.

Figure 3A:
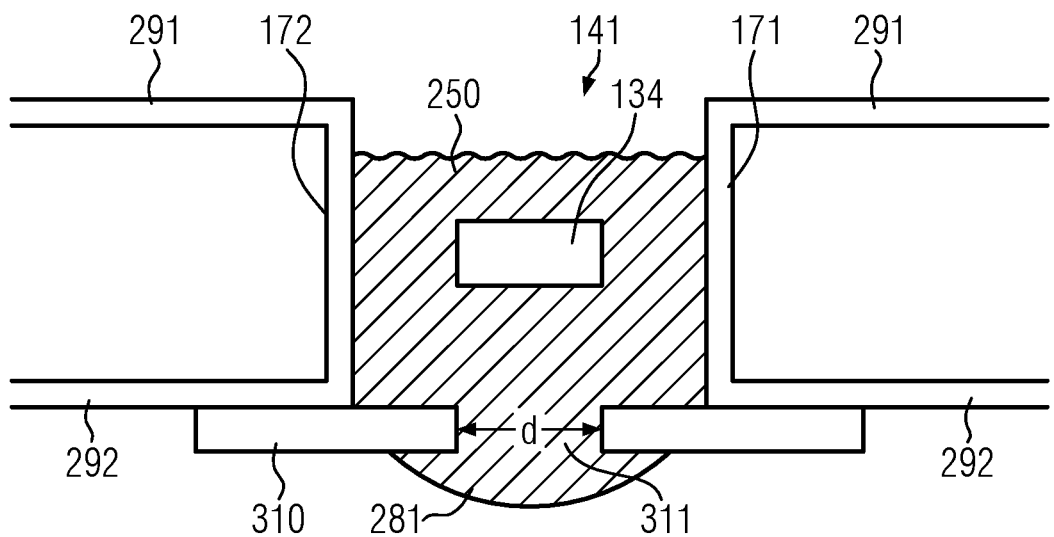
FIG. 3a is a sectional view of another embodiment the valve of FIG. 1a taken across line A-A.
Figure 3B:
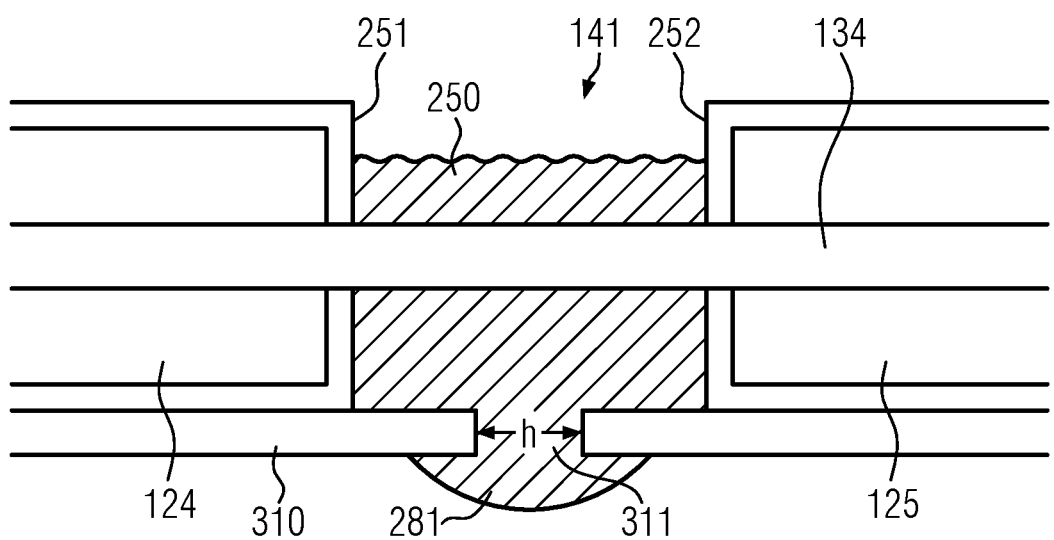
FIG. 3b is a sectional view of another embodiment the valve of FIG. 1a taken across line B-B.

FIGS. 3a and 3b show an embodiment alternative to FIGS. 2a and 2b.

While the basic configuration or arrangement of further walls 171 and 172 and boundary surfaces 251 and 252 is substantially the same as that in FIGS. 2a and 2b, it is additionally provided here that the valve housing of the valve comprises a base 310. While a base is presently described, it is understood that the embodiment of FIGS. 3a and 3b can also be transferred directly to a cover which is then arranged on the opposite side of the valve housing as compared to the arrangement of the base. It is also understood that both a base and a cover can be provided in accordance with the embodiment describing the seat.

As can be seen in FIG. 3a, base 310 comprises an opening 311. In this embodiment, sealing material 250 is provided such that it also passes at least in part in region 281 through opening 311 and wets or covers the surface of base 310 facing away from open space 141 so that opening 311 in base 310 is also closed by the sealing material. However, opening 311 there does not need to be closed in a gas-tight manner. It is sufficient to have the material extend in part into the exterior space outside the opening.

Diameter d of opening 311 is preferably smaller than the spacing between walls 171 and 172, where this spacing can be selected according to the values described in FIGS. 2a and 2b. The diameter of the opening, at least along the A-A direction, is preferably at most 75%, preferably at most 50%, particularly preferably at most 25% as large as the spacing of walls 171 and 172 from one another.

Instead of base surfaces 292, base 310 can also define further walls 171 and 172 in the downward direction, so that corresponding surfaces 292 can also be dispensed with entirely, which leads to material savings. Base 310 (and analogously for a cover that may be provided) does not need to extend over the entire size of the valve housing, but instead only needs to be provided in such a way that it restricts the open space in the downwardly direction (or upwardly direction for a cover) except for opening 311.

The same applies accordingly to FIG. 3b for a view onto open region 141 along the B-B direction.

Here as well, the base provided comprises an opening 311 through which sealing material 250 passes at least in part in accordance with material 281, so that it wets the side of the base disposed opposite to the open space. Having the sealing material seal entire opening 311 in this direction as well is intended.

The diameter of opening 311, presently designated as h, can be equal to diameter d of the opening in FIG. 3a, although this is not necessarily the case. In particular, the opening does not need to be a circular opening but can also be, for example, an elongate, oval, rectangular, square or any shape opening. Particularly preferably, the opening in the sectional direction shown in FIG. 3a is larger than in the direction shown in FIG. 3b, because this allows the material to enter in this direction over a larger region during the manufacture of the valve, which simplifies the complete enclosure of connecting element 134 in this direction.

In the embodiment shown here, it can also be provided that base 310 not only defines open space 141 in the downward direction (analogously for a cover), but that it also defines the valve chambers at least in this region. It can also be provided that base 310 forms the entire lower boundary of the valve chambers. However, this is not mandatory.

In particular, it can be provided that a base or a cover according to the embodiment of FIG. 3b extends over a region over the valve housing or under the valve housing, respectively, that is only insignificantly larger than the dimensions of the open space between the individual valve chambers. In this way, the material and also the weight of the valve can be reduced, which lowers costs and leads to advantageous effects when installing this valve.

The dimensions mentioned with reference to FIGS. 2a and 2b can also be applied analogously to the embodiment of FIGS. 3a and 3b.

While the valve was shown in FIGS. 1a to 3b in its intended shape after manufacture, the basic sequence in a method of manufacture of this valve shall be described below.

First, a valve housing is manufactured. This can be made from individual parts or, for example, completely from one piece as part of an injection molding method. At the same time, before or after, a conductor element 161 is produced which comprises the main printed circuit board (see FIG. 1a) as well as the individual printed circuit boards for the individual valve chambers and corresponding connecting elements. The conductor element can be integrally formed, but this is not mandatory. For example, the printed circuit boards for the individual valve chambers can also be manufactured separately and connected to further printed circuit boards of further valve chambers using suitable plug connections for providing the necessary printed circuit boards and connecting elements depending on the number of individual valve chambers. This embodiment is preferred if the valve housing is manufactured integrally, since it is then not possible to insert the conductor element.

Irrespective thereof, the conductor element is then introduced into the valve housing in a next step. Furthermore, connections can be made to the actuators for ensuring the functionality of the valve. In addition, the valve housing can then be closed at least in the region of the valve chambers so that they form a closed space (apart from the connecting openings).

The sealing material is then introduced, preferably in liquid form, into the open space or the open spaces between the individual valve chambers. The sealing material can be an adhesive, but also (curable) plastic material, in particular plastic material that can be introduced into the open space in the context of injection molding methods. The introduction there takes place in such a way that enough sealing material is introduced into the open space in order to effect the sealing of the openings in the boundary surfaces and the connecting element against to the exterior space. If a valve according to the embodiment of FIGS. 3a and 3b is provided, then the base (or cover or both elements) is arranged prior to the introduction of the sealing material, where the sealing material is then introduced in a quantity such that it emerges from the respective opening in the base and/or cover.

If the sealing material introduced is a liquid material, then a drying step can take place as a subsequent step, for example by UV hardening, heating or the like, so that the sealing material cures. The valve can then be installed, for example, in a vehicle seat.

The invention claimed is:

1. A valve comprising:
    a valve housing having a first region and a second region;
    at least one valve chamber configured to be pressurized with air, each of the valve chambers including an actuating element for opening and closing a valve opening of the valve chamber and an actuator for actuating the actuating element arranged in the first region;
    a printed circuit board extending into each valve chamber and being configured to electrically operate the actuator, wherein the printed circuit board in each of the valve chambers are connected to a common main printed circuit board arranged in the second region;
    each valve chamber being surrounded by boundary surfaces of the valve housing, the boundary surfaces closing the valve chamber in a gas-tight manner; and
    an open space open to at least two oppositely disposed sides of the valve housing extends between at least two of the valve chambers, a connecting member of the printed circuit boards extends through connecting openings of the boundary surfaces of adjacent valve chambers and the open space and
    a sealing material located in the open space enclosing the connecting member and the connecting openings in a gas-tight manner at least in the direction of the oppositely disposed sides.

2. The valve according to claim 1, wherein the open space extends in a plane running substantially parallel to a main plane of the printed circuit boards and defined by the boundary surfaces and two further walls of the valve housing, wherein the boundary surfaces are disposed opposite one another and the further walls are disposed opposite one another and extend between the boundary surfaces.

3. The valve according to claim 2, wherein spacing between the further walls is 5 mm to 15 mm.

4. The valve according to claim 2, wherein the connecting member has a width of 5 mm to 15 mm along a shortest connecting line of the further walls.

5. The valve according to claim 1, wherein the open space defines at least one opening in at least one of a base of the valve housing and a cover of the valve housing.

6. The valve according to claim 5, wherein the open space extends in at least one direction perpendicular to the longitudinal direction of the opening in an amount greater than an amount the opening extends in the longitudinal direction of the opening.

7. The valve according to claim 6, wherein the sealing material fills the open space at least in part and the sealing material extends into a region extending through the opening into an exterior space of the valve.

8. The valve according to claim 1, wherein the sealing material fills the open space at least in part.

9. The valve according to claim 1, wherein a spacing between the boundary surfaces in the open space is 1 mm to 5 mm.

10. The valve according to claim 1, wherein the connecting member extends 1 mm to 3 mm in a direction from one of the oppositely disposed sides of the valve housing to the other of the oppositely disposed sides of the valve housing.

11. The valve according to claim 1, wherein in each valve chamber the valve is an SMA valve, wherein the actuator is an SMA actuator, and wherein the printed circuit board is able to heat the SMA actuator with current to activate the SMA actuator.

12. A method for manufacturing a valve according to claim 1, the method comprising the steps of:
    manufacturing a conductor element including the printed circuit board in each valve chamber and the main printed circuit board;
    introducing the conductor element in a further step into the valve housing; and
    filling the open space at least in part with the sealing material from at least one side after the introducing step so that the sealing material seals the connecting member and the connecting openings in a gas-tight manner at least in the direction of the oppositely disposed sides.

13. The method according to claim 12, further including connecting at least one of a cover and a base of the valve housing to the valve housing before the filling step so that the sealing material seals the connecting member and the connecting openings in a gas-tight manner at least in the direction of the oppositely disposed sides and extends through an opening of at least one of the cover and the base into an exterior space of the valve.

14. The method according to claim 12, wherein the filling step includes introducing the sealing material in a liquid state and subsequently drying the sealing material.

* * * * *